Figure 6:
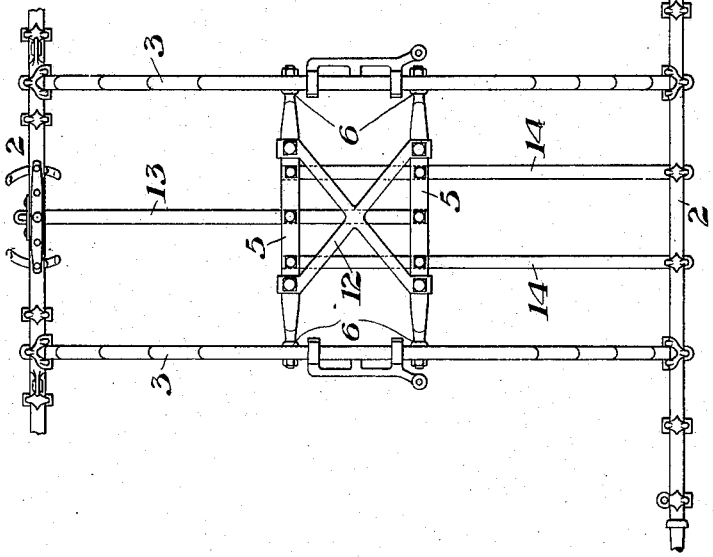

No. 867,233. PATENTED OCT. 1, 1907.
C. A. BEHLEN.
SIDE SPRING VEHICLE.
APPLICATION FILED JULY 20, 1906.
3 SHEETS—SHEET 1.
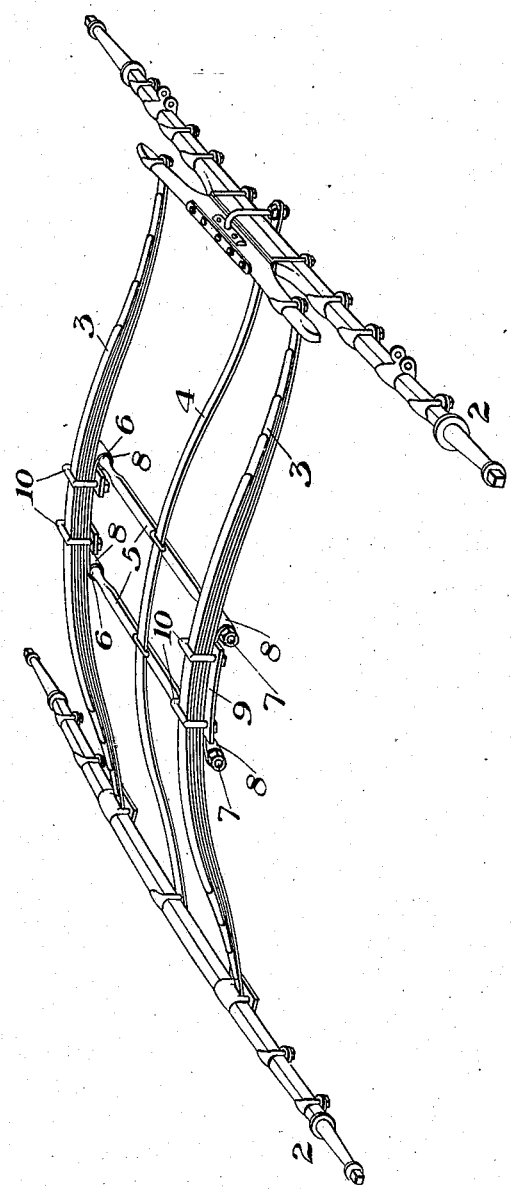
WITNESSES
INVENTOR No. 867,233.
PATENTED OCT. 1, 1907.
C. A. BEHLEN.
SIDE SPRING VEHICLE.
APPLICATION FILED JULY 20, 1906.
3 SHEETS—SHEET 2.
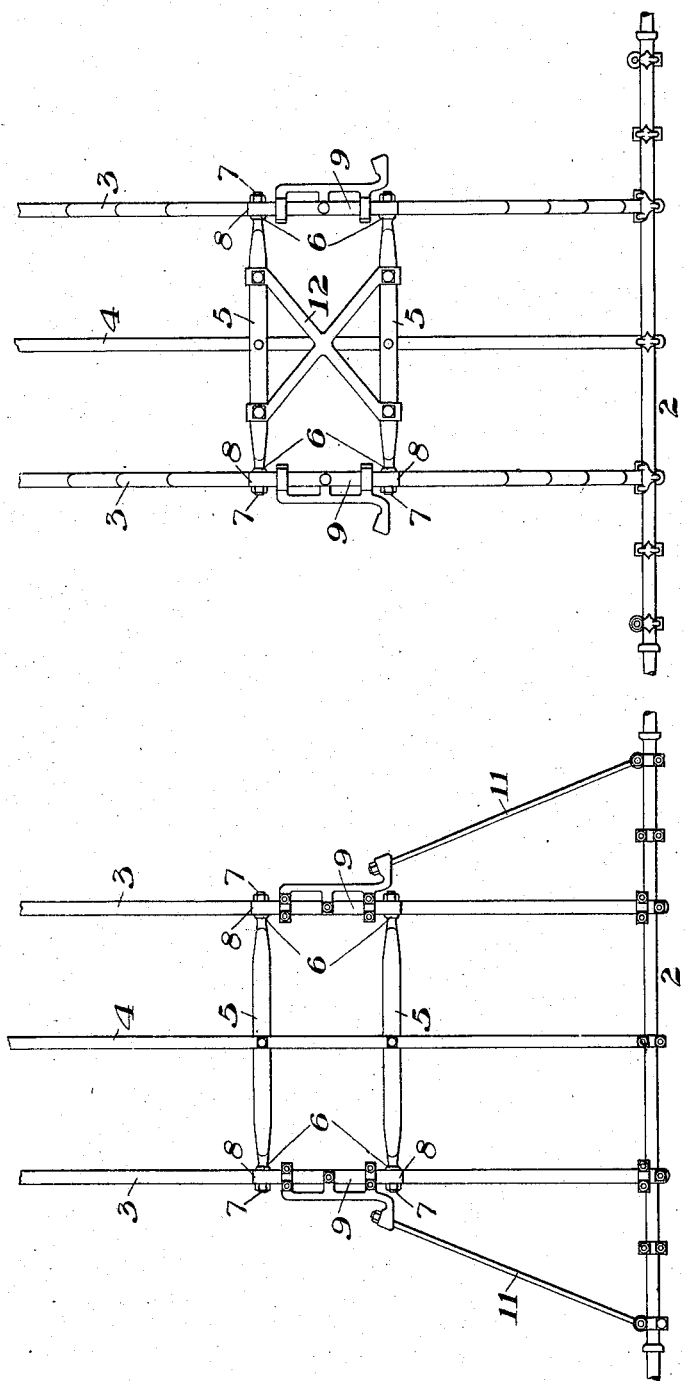
WITNESSES
INVENTOR No. 867,233. PATENTED OCT. 1, 1907.
C. A. BEHLEN.
SIDE SPRING VEHICLE.
APPLICATION FILED JULY 20, 1906.

3 SHEETS—SHEET 3.

WITNESSES
Warren W Swartz
H. M. Corwin

INVENTOR
Chas. A. Behlen,
by Bakewell & Byrnes
his Attys.

THE NORRIS PETERS CO., WASHINGTON, D. C.

UNITED STATES PATENT OFFICE.

CHARLES A. BEHLEN, OF DURHAM, NORTH CAROLINA, ASSIGNOR TO DURHAM BUGGY COMPANY, OF DURHAM, NORTH CAROLINA, A CORPORATION OF NORTH CAROLINA.

SIDE-SPRING VEHICLE.

No. 867,233.  Specification of Letters Patent.  Patented Oct. 1, 1907.

Application filed July 20, 1906. Serial No. 326,969.

To all whom it may concern:

Be it known that I, CHARLES A. BEHLEN, of Durham, Durham county, North Carolina, have invented a new and useful Side-Spring Vehicle, of which the following is a full, clear, and exact description, reference being had to the accompanying drawings, forming part of this specification, in which—

Figure 1 is a perspective view of a side spring vehicle gear embodying my invention; Fig. 2 is a detail view of one of the spring braces; and Figs. 3, 4, 5 and 6 are plan views showing modifications, Figs. 3, 4 and 5 being partially broken away.

The object of my invention is to provide a novel construction and arrangement of cross braces for the side springs for the purpose of keeping the gear in perfect square, and also to provide a narrow spring bearing combined with a wide body bearing, the narrow spring bearing giving a maximum of elasticity while the wide body bearing gives a firmer support to the body.

A further object is to prevent twisting of the cross bars or braces when the springs are in action, and which tend to cause crystallization and breakage.

Other objects and advantages of my invention will hereinafter appear.

With these objects in view, my invention consists in the novel construction, arrangement and combination of parts, all substantially as hereinafter described and pointed out in the appended claims.

In the drawings, the numerals 2 designate the front and rear axles, 3 the side springs, 4 the center spring and 5 the cross bars or braces for the side springs. The bars or braces 5 are formed near each end with a shoulder 6 and the extensions or spindles 7 beyond these shoulders are journaled in eyes 8 of spring plates 9 which are secured to the springs 3 preferably at the under sides of the same by means of clips 10 intermediate of the eyes. These shouldered bars form a positive brace which keeps the gear in square, and the journaling of their end portions in the eyes of the spring plates prevents any tendency of the bars to twist when the springs are in action. Heretofore it has been customary to clip the braces directly to the springs, and when the vehicle is loaded this causes a twisting action on the braces which results in crystallization and breakage. This is entirely overcome by my invention, since no matter whether the springs are loaded or not the braces always remain level.

In the modification shown in Fig. 3, the construction is similar to that of Fig. 1 with the exception that oblique stay rods 11 are employed running from the rear center of the gear to the rear axle at points near the hubs.

In the modification shown in Fig. 4, the construction is similar to that shown in Fig. 1, with the exception that a cross-shaped cross brace 12 is secured to the brace bars 5 between the side springs as a further means for stiffening the gear and keeping it in square.

Figure 5:
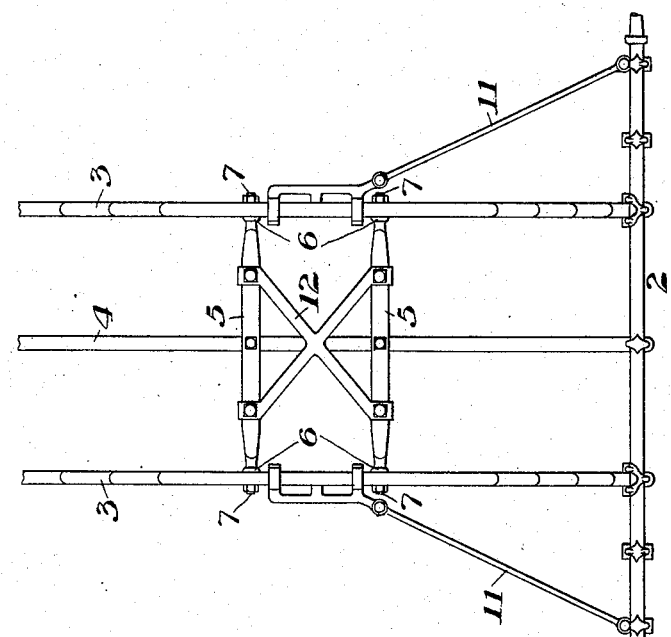

In the modification shown in Fig. 5, stay rods 11 and the cross-brace 12 are both employed.

In all of the constructions thus far described, a single center spring 4 is shown. Fig. 6, however, shows a modification having a single center spring 13 running from the front axle to the rear stay bar 5, and two center springs 14 running from the rear axle to the front stay bar 5.

The advantages of my invention consist in the manner in which the spring braces are connected to the springs to brace the same, while at the same time they are entirely prevented from twisting by the journaling of their end spindles.

Various changes may be made in the details of construction and arrangement without departing from the spirit and scope of my invention, since

What I claim is:—

1. In a reachless side spring vehicle-gear, a pair of side springs, a center spring in the same plane as the side springs, said side and center springs being directly secured to the axle and bolster, respectively, at their ends, a plate secured to the underside of each of the side springs at the central portion thereof and having separated eyes and a pair of horizontal, transverse, brace-bars connecting the side springs and having their end portions engaging said eyes, the said bars having stops for preventing lateral or endwise movement; substantially as described.

2. In a reachless side spring vehicle gear, a pair of side springs directly connected at one end to the rear axle and at the opposite end to a portion of the bolster, a plate secured to the under side of each of the springs at its central portion, and a pair of horizontal brace bars having shouldered ends engaging eyes carried by the said plates; substantially as described.

3. In a reachless side spring vehicle, a pair of side-springs connecting the rear axle and the front bolster, an elongated plate secured to the central portion of each of the springs at the under side thereof, said plate having eyes at its end portions, and a pair of cross-braces having reduced end portions journaled in said eyes and shoulders which bear against the inner faces of the eyes; substantially as described.

4. In a side spring vehicle gear, a pair of side springs extending from axle to axle, a pair of cross-bars extending below the central portions of the springs and journaled in bearings on the under sides thereof, and a brace-rod connected to each side spring adjacent to the cross bars and extending obliquely rearward and outward to the rear axle; substantially as described.

5. In a side spring vehicle gear, a pair of side springs extending from axle to axle, a pair of cross-bars extending below the central portions of the springs and journaled in bearings on the under sides thereof, and brace rods secured at one end to the respective side-springs near the central portion of the springs and at the outer side thereof and extending thence obliquely rearward and outward to the rear axle; substantially as described.

In testimony whereof, I have hereunto set my hand.

CHARLES A. BEHLEN.

Witnesses:
W. J. WELCH,
W. V. MINOR.